United States Patent [19]

Taniguchi

[11] Patent Number: 5,289,569
[45] Date of Patent: Feb. 22, 1994

[54] DOCUMENT PROCESSING SYSTEM CAPABLE OF SIMULTANEOUSLY DISPLAYING TWO CONTINUOUS DOCUMENT PAGES IN ACCORDANCE WITH A SELECTED BINDING POSITION

[75] Inventor: Yukari Taniguchi, Chofu, Japan

[73] Assignee: Canon Kabushiki Kaisha, Tokyo, Japan

[21] Appl. No.: 938,594

[22] Filed: Sep. 3, 1992

Related U.S. Application Data

[63] Continuation of Ser. No. 303,061, Jan. 30, 1989, abandoned, which is a continuation of Ser. No. 861,875, May 12, 1986, abandoned.

[30] Foreign Application Priority Data

May 21, 1985 [JP] Japan .................. 60-106979

[51] Int. Cl.$^5$ .................. G06F 3/12; G06F 3/14; G06K 15/00
[52] U.S. Cl. .................. 395/145; 395/146; 395/147; 395/111; 364/DIG. 2; 364/943; 364/927.7; 345/121; 345/201
[58] Field of Search ............ 395/145, 111; 340/700

[56] References Cited

U.S. PATENT DOCUMENTS

| | | | |
|---|---|---|---|
| 3,982,744 | 9/1976 | Kraynak et al. | 400/63 |
| 4,240,075 | 12/1980 | Bringol | 340/798 |
| 4,414,628 | 11/1983 | Ahuja et al. | 395/158 |
| 4,425,629 | 1/1984 | Carson et al. | 395/148 |
| 4,441,829 | 4/1984 | Hebert, Jr. et al. | 400/63 |
| 4,491,933 | 1/1985 | Ursin et al. | |
| 4,498,150 | 2/1985 | Gaudot et al. | |
| 4,539,653 | 9/1985 | Bartlett et al. | |
| 4,571,700 | 2/1986 | Emry, Jr. et al. | |
| 4,608,662 | 8/1986 | Watanabe et al. | |
| 4,640,611 | 2/1987 | Ohdake et al. | 355/77 |
| 4,641,197 | 2/1987 | Miyagi | 364/523 |
| 4,642,792 | 2/1987 | Clements et al. | 395/275 |
| 4,649,513 | 3/1987 | Martin et al. | |
| 4,658,351 | 4/1987 | Teng | |
| 4,675,743 | 6/1987 | Riseman et al. | 358/263 |
| 4,679,153 | 7/1987 | Robinson et al. | 364/523 |
| 4,709,348 | 11/1987 | Horn et al. | |
| 4,723,210 | 2/1988 | Barker et al | 395/147 |
| 4,739,477 | 4/1988 | Barker et al. | 395/600 |
| 4,903,233 | 2/1990 | Hirami et al. | |

Primary Examiner—Parshotam S. Lall
Assistant Examiner—Krisna Lim
Attorney, Agent, or Firm—Fitzpatrick, Cella, Harper & Scinto

[57] ABSTRACT

A document processing system which makes document files while displaying the inputted document (such as characters, figures, symbols, etc.) has a display section to display the files of the documents which are divided on a page unit basis; an instructing device to prompt a predetermined display so that the printing position when each page of the files was printed can be determined; and a controller for controlling the display section so as to display the files of at least two continuous pages on one screen due to the display instruction of the instructing device such that the state after the files were printed and bound can be known. With this system, a document of continuous pages can be very easily edited on the same display screen while preliminarily checking the printing and binding format.

20 Claims, 7 Drawing Sheets

MODE A

FIG. 7
MODE B

FIG. 8
MODE C

FIG. 9
MODE D

FIG. 10
MODE E

LAST PAGE

FIRST PAGE

DOCUMENT PROCESSING SYSTEM CAPABLE OF SIMULTANEOUSLY DISPLAYING TWO CONTINUOUS DOCUMENT PAGES IN ACCORDANCE WITH A SELECTED BINDING POSITION

This application is a continuation of application Ser. No. 07/303,061 filed Jan. 30, 1989, now abandoned, which is a continuation of 861,875 filed May 12, 1986, abandoned.

BACKGROUND OF THE INVENTION

1. Field of the Invention

The present invention relates to a document processing system which makes document files while displaying characters, figures, symbols, and the like which are inputted. In this invention, all of the characters, figures, symbols, images, and the like are referred to as a document. Namely, "document" may be constituted by only characters or characters, figures, graphs, images, and the like, or only images. The invention may be embodied in a whole system or in a single piece of equipment.

2. Related Background Art

Figure 1:
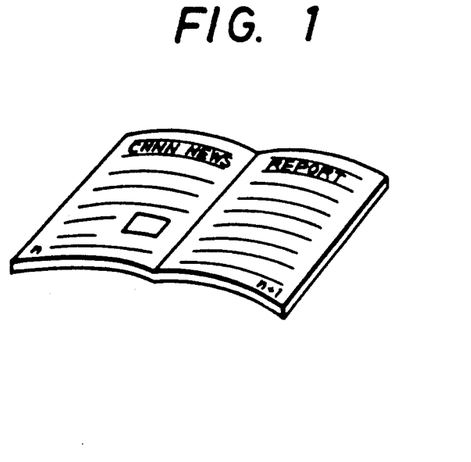
FIG. 1 is a diagram for explaining an example of edition of the result of the print output.
Figure 2:
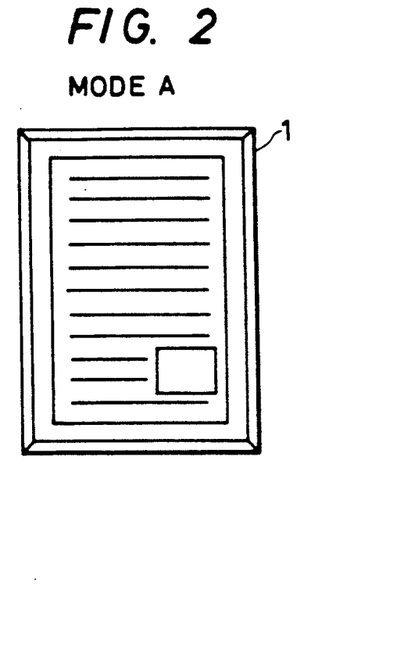
FIG. 2 is a diagram for explaining a method for the window display.

In the case of editing a document of which the files created by a work station or the like were printed by a printer, it is demanded to edit the document with a format such that two sheets of printed matters can be simultaneously seen as a double-spread page consisting of the left and right pages as shown in, e.g., FIG. 1. Namely, in the case of reading the double-spread bound page, if the document is bound to has a format such that the reader must turn over the preceding page or next page to read, the document; further, it is extremely inconvenient to read. Practically speaking, if the headline of "CNNN NEWS REPORT" is edited on the left and right double-spread pages as shown in FIG. 1, this headline can be very easily seen. Unless otherwise, the function as a headline won't be attained. However, according to the conventional display system, the portion which is displayed in a display screen (hereinafter, referred to as a window) is only one page as shown in FIG. 2 (such a display mode is referred to as a mode "A" for convenience of explanation). Therefore, there is the drawback such that the position where the displayed page is printed after it was edited (for example, the left page or right page) cannot be preliminarily known until it is actually printed and bound.

SUMMARY OF THE INVENTION

The present invention is made in consideration of the foregoing drawback and intends to provide a document processing system in which when the contents of files are created or edited, the document editing work can be easily performed by enabling the relation of continuous pages and the printing positions which are presumed to be understood at a glance.

Another object of the invention is to provide a document processing system in which, even if a document is edited, desired continuous pages can be outputted without breaking the output format thereof.

Still another object of the invention is to provide a document processing system which creates document files while displaying characters, figures, symbols, and the like which are inputted. The system has a display section to display the files of documents and the like which are divided on a page unit basis, and instructing means for instructing a predetermined display, wherein at least two continuous pages are displayed on one screen (similar to the format after they are printed and bound), thereby enabling the document editing work to be easily performed.

DETAILED DESCRIPTION OF THE PREFERRED EMBODIMENTS

The invention will now be described in detail hereinbelow with reference to the drawings.

Figure 3:
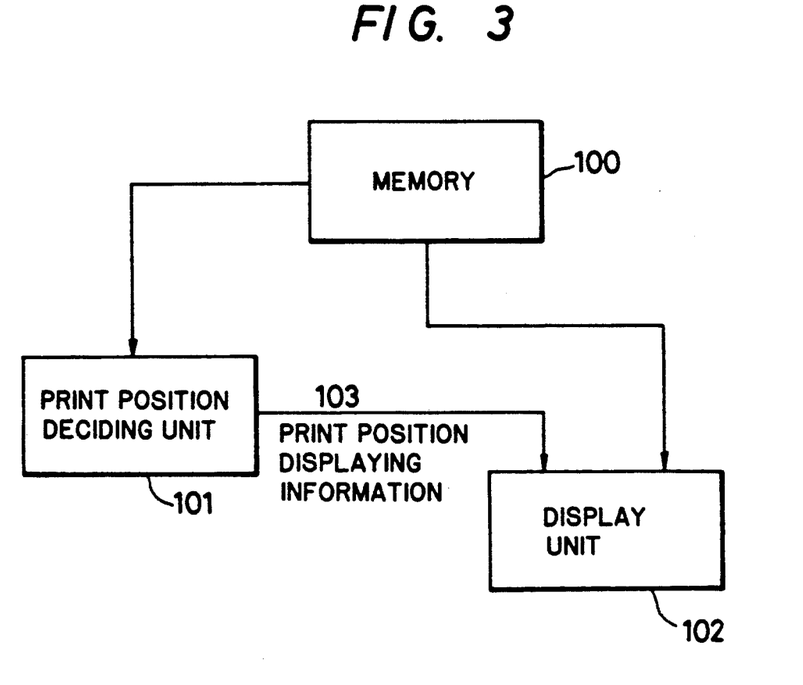
FIG. 3 is a fundamental arrangement diagram of an embodiment according to the present invention.

A document processing system of an embodiment is shown in FIG. 3 as an example of means for accomplishing the foregoing objects. This system comprises a memory 100 to store a document or the like which is divided on a page unit basis; print position deciding unit 101 for outputting a print position displaying information 103 indicative of the printing position of each page; and display unit 102 for displaying the contents of a plurality of pages in the memory 100 and the print position displaying information 103 which is instructed by the print position deciding unit 101.

With this constitution, the print position deciding unit 101 generates the print position displaying information for allowing, for example, the page which is printed on the right side to be displayed on the right side of the display screen and allowing the page which is printed on the left side to be displayed on the left side of the display screen. As another display format, for instance, the indication representative of the right side is further added to the page which is printed on the right side and displayed, and the indication representative of the left side is further added to the page which is printed to the left side and displayed.

An embodiment of the invention will now be described further in detail hereinbelow with reference to the drawings.

Figure 4A:
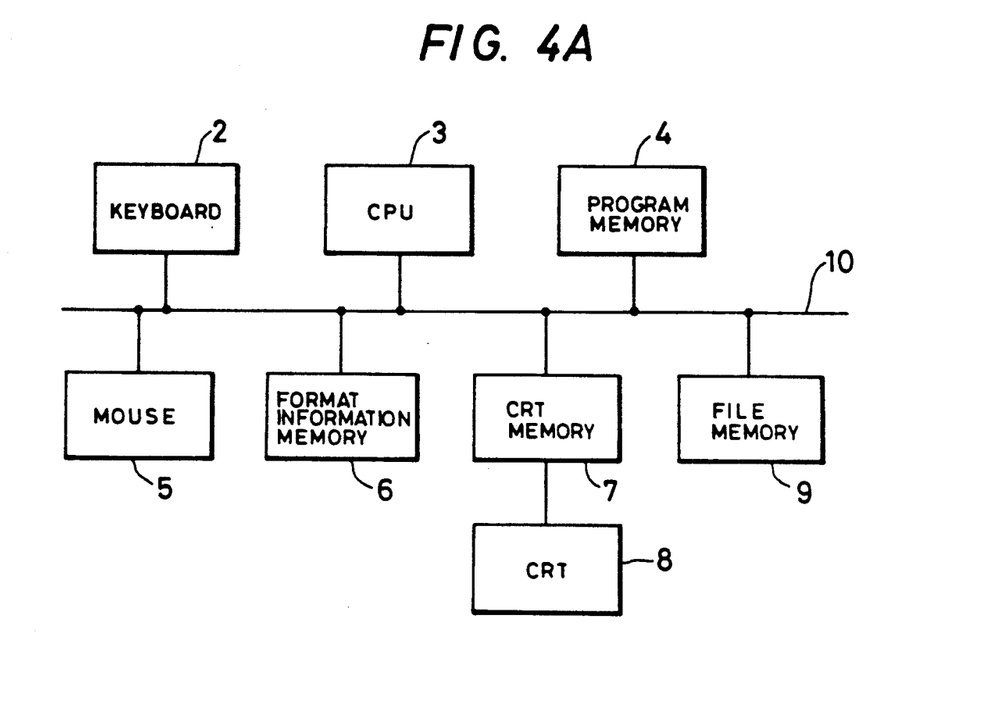
FIG. 4A is a circuit block diagram of the embodiment.

FIG. 4A is a block diagram of a document processing system according to an embodiment of the present invention. In the diagram, a keyboard 2 is provided to input characters, symbols, and the like. A pointing device, e.g., a mouse 5 is provided as another input means. A CRT 8 displays data in a CRT memory 7. The data displayed on the CRT 8 corresponds one-to-one with the data stored in the CRT memory 7. A file memory 9 stores the document files created. A CPU 3 is a central processing unit to control the embodiment in accordance with a control procedure stored in a program memory 4 and shown in flowcharts of FIGS. 6A and 6B.

Figure 5A:
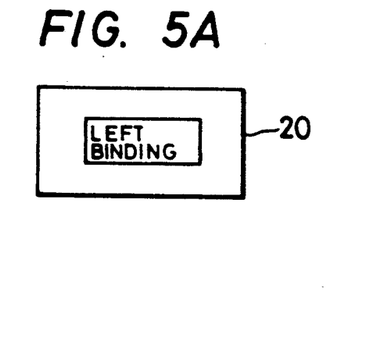
FIGS. 5A and 5B are diagrams for explaining keys which are added to a keyboard.
Figure 5B:
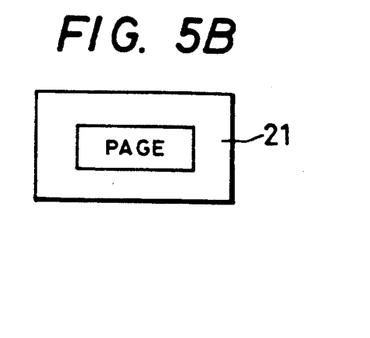

The keyboard 2 includes a "left binding" key 20 as shown in FIG. 5A as well as ordinary keys. By depressing the "left binding" key 20, a function according to the embodiment is executed. A page key 21 shown in FIG. 5B is provided to display the designated page number on the CRT 8.

Figure 4B:
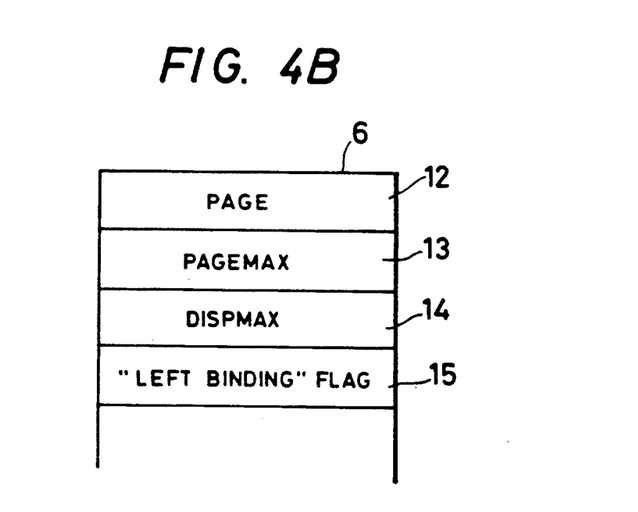
FIG. 4B is a diagram showing a constitution of information in a format information memory.

A format information memory 6 stores the following information and its construction is shown in FIG. 4B.

PAGE 12: The page number of the portion which is currently being displayed in the window.

DISP-MAX 13: PAGEMAX

The maximum number of characters which can be displayed in one page.

DAGEMAX 14: The total number of pages of the relevant file.

"LEFT BINDING" FLAG 15:

When this flag is "1", it means that the file is printed so as to have the layout of the double-spread page such that, for example, the odd-number page is printed on the right side (the left edge is used as the binding margin) and the even-number page is printed on the left side (the right edge is used as the binding margin). This flag may be also considered as the flag indicating that the page which is currently being displayed is always printed on the right side of the double-spread page after the edition. The page preceding the page which is currently being displayed is inevitably printed on the left side.

Figure 6A:
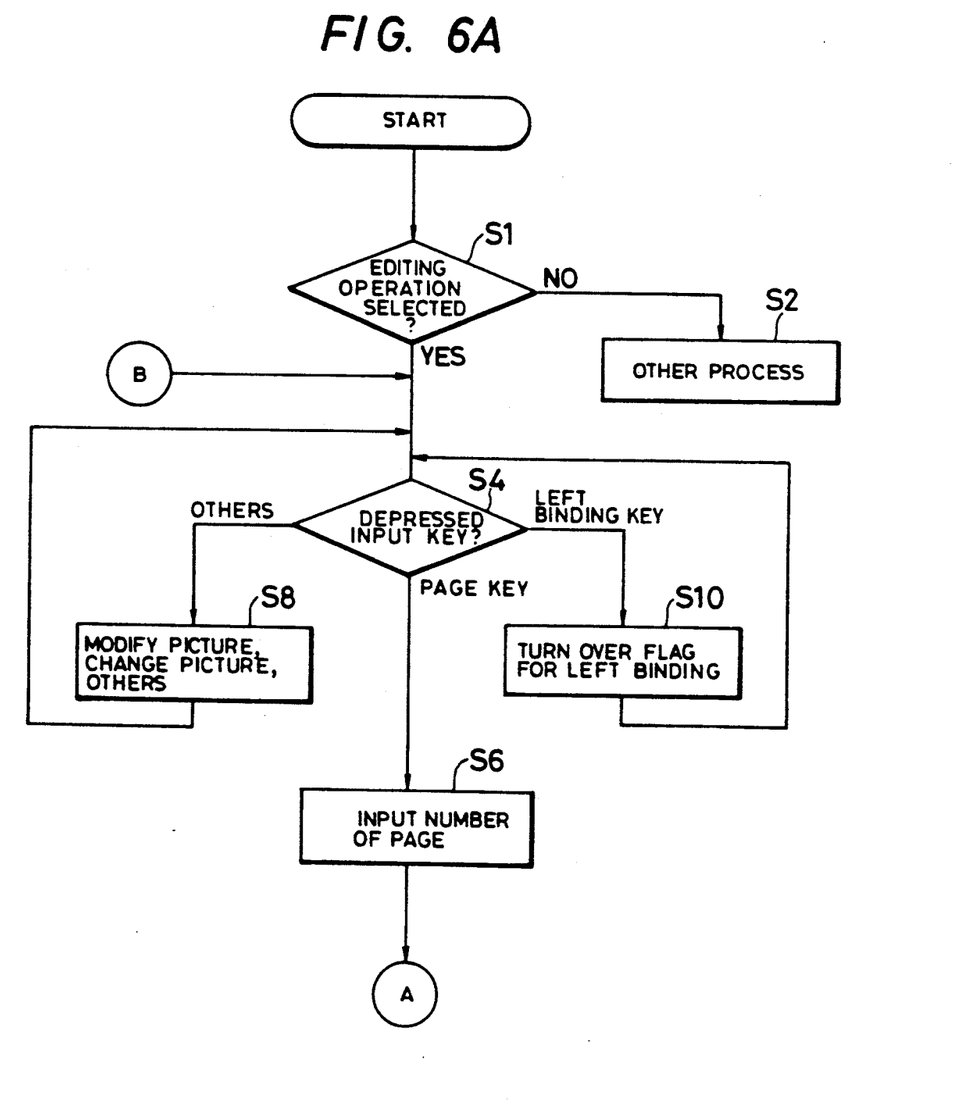
FIGS. 6A to 6C are flowcharts for a control procedure of the embodiment.
Figure 6B:
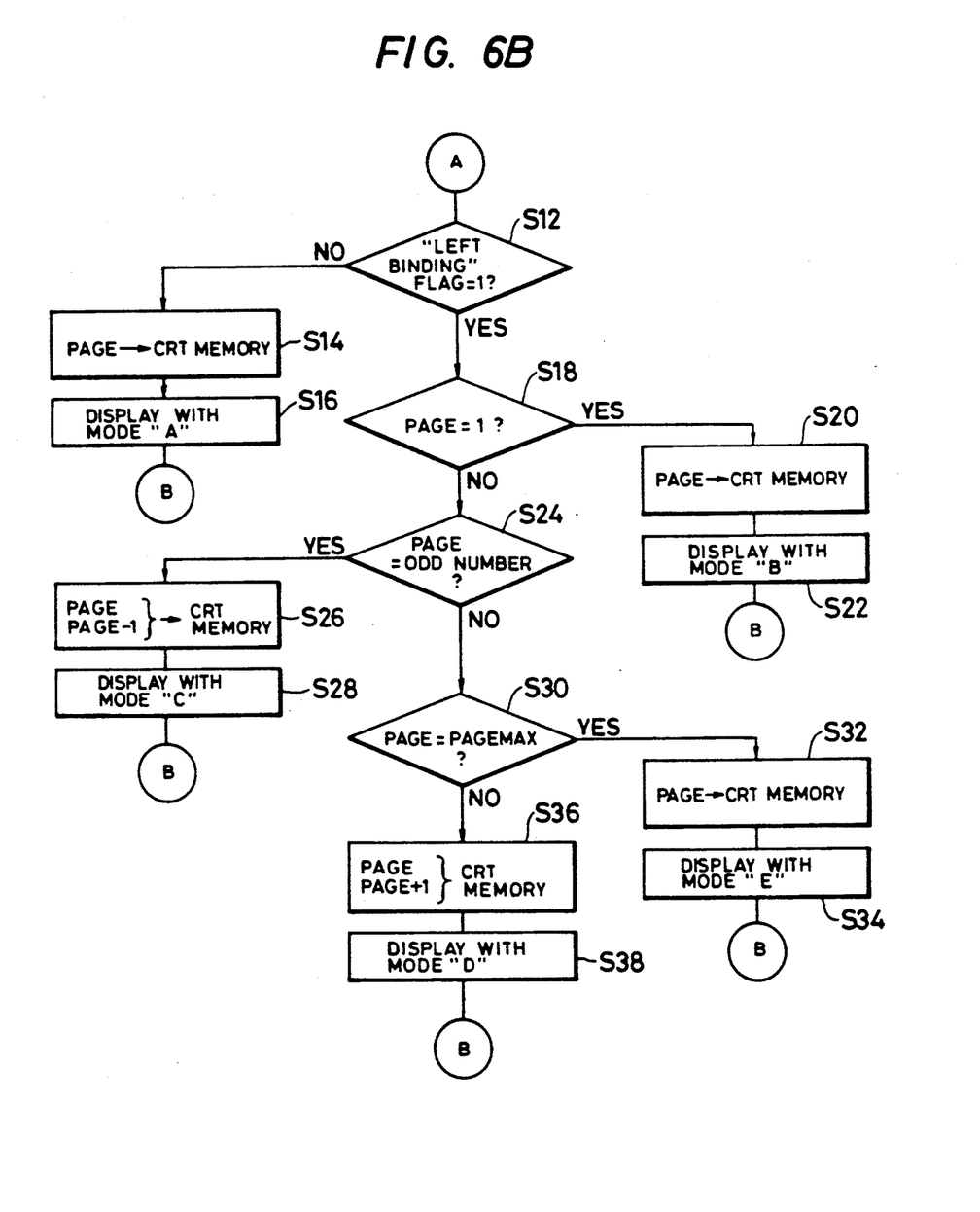

The control operation of the embodiment will now be described with reference to the flowcharts of FIGS. 6A and 6B. These flowcharts are based on the assumption that the printed pages are bound like a double-spread page such that the odd-number page is printed on the right side and the even-number page is printed on the left side as shown in FIG. 1. However, the choice of whether the odd-number (evennumber) page is printed on the right (left) side or not is merely a problem of the printing sequence. Therefore, the flowcharts of FIGS. 6A and 6B are merely an example.

First, a check is made in step S1 to see if the operator has selected the editing operation or not. The editing operation is selected by pressing a predetermined key (editing key) in the keyboard 2. If the editing operation is not selected, the other process is executed in step S2.

If the editing operation is selected, step S4 follows and a check is made to see if the input key has been pressed or not. When the page key 21 is pressed, step S6 follows and the operator inputs the number of the page. This input page number is stored into the PAGE block 12 of the format information memory 6. Then, a check is made in step S12 to see if the "LEFT BINDING" flag 15 is "1" or not. In this case, since the "left binding" key 20 is not yet pressed, step S14 follows. In step S14, the display data designated by the content of the PAGE block 12 is shifted from the file memory 9 to the CRT memory 7. The mode "A" (FIG. 2) is displayed in step S16. The processing routine is then returned to step S4. The operator then executes the modification, change, or the like of the picture in step S8 while observing the display of the mode "A".

When the "left binding" key 20 is pressed in step S4, step S10 follows and the "LEFT BINDING" flag 15 is turned over. If this key is pressed for the first time, this flag is set from "0" to "1". Depressing the key 20 again means that the flag 15 is contrarily set from "1" to "0".

Figure 7:
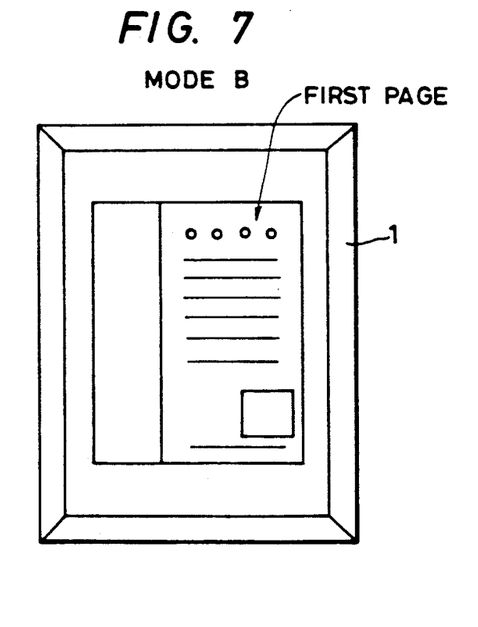
FIGS. 7 to 10 are diagrams for explaining the window display in the case of the left binding of the result of the print output.

When the page key 21 is pressed in step S4 after the "LEFT BINDING" flag 15 was set to "1", the processing routine advances from step S4 to steps S6, S12, and S18. In step S18, a check is made to see if the content of the PAGE 12 in the memory 6 is "1" or not in order to check whether the page which is being displayed is the first page or not. If PAGE="1", the display data indicated by the PAGE 12 is stored into the CRT memory 7 as shown in FIG. 4 in step S20 and displayed with the mode "B" in step S22. As shown in FIG. 7 as well, in the mode "B", the blank (corresponding to the inside of the cover of the book) is displayed in the left window and the content of the first page is displayed in the right window.

If the content of the PAGE 12 is not "1" in step S18, step S24 follows and a check is made to see if the content of the PAGE 12 is an odd number or not. This is because the odd-number page is displayed on the right side of the window and the even number page is displayed on the left side of the window, individually.

Figure 8:
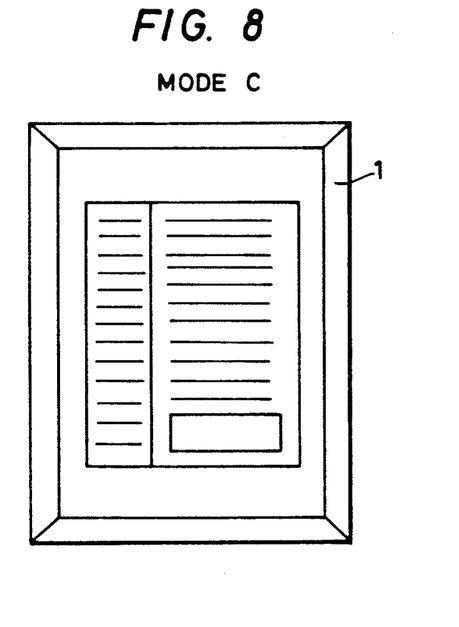

If an odd-number page is indicated in Step S24, step S26 follows and the display data indicated by the PAGE block 12 and the display data of the preceding page (which is designated by PAGE-1) are read out of the file memory 9 and arranged as shown in FIG. 8. Then, these display data are stored into the CRT memory 7 and displayed with the mode "C" (FIG. 8) in step S28. In the mode "C", the content of the relevant page is displayed on the right side and the preceding page is displayed on the left side. Namely, the state of the double-spread page after completion of the printing and binding is displayed as it is on the display screen. This display state can be used in a manner such that, for example, when a graph exists in the right page, it is possible to easily check whether the description of this graph exists in the left page or not. If NO, by shifting only the graph to the next page due to the operation in step S8, it is possible to simultaneously see the graph and its description in the state of the double-spread page after completion of the printing and binding.

Figure 9:
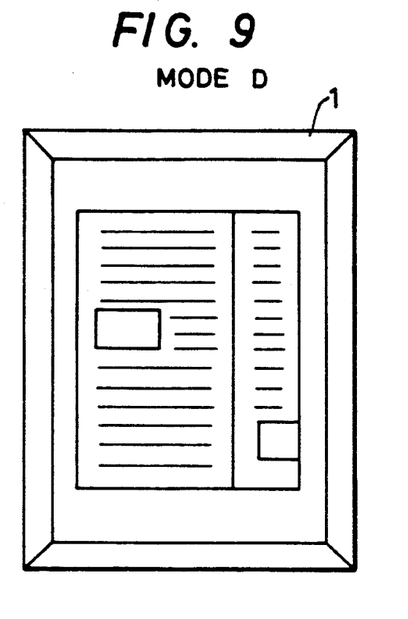
Figure 10:
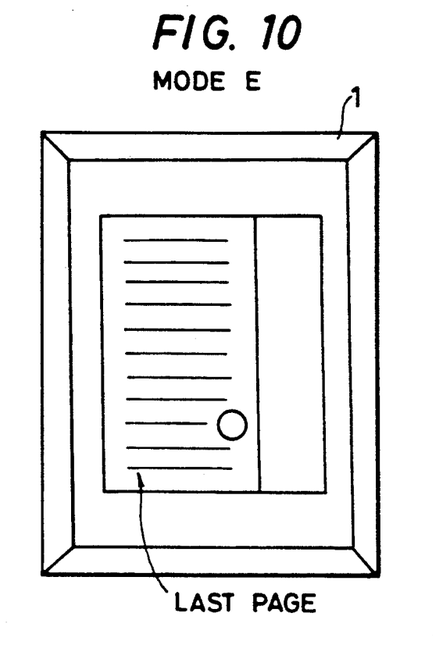

A check is made in step S30 to see if the designated page is the last page or not. If NO, the designated page (even-number page) is displayed on the left side and the next page is displayed on the right side (mode "D" in FIG. 9) in steps S36 and S38. If the designated page is the last page, the last even-number page is displayed on the left side and a blank is displayed on the right side (mode "E" in FIG. 10) in steps S32 and S34.

In this manner, according to the embodiment, two continuous pages in the format of the double-spread page are simultaneously displayed on one picture screen, so that the document can be edited such that it can be easily read as possible after completion of the printing.

Figure 11:
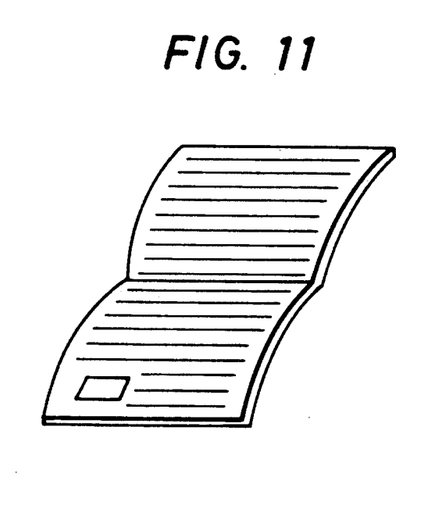
FIG. 11 is a diagram for explaining an example of edition in the case of the upper binding of the print output result.
Figure 12:
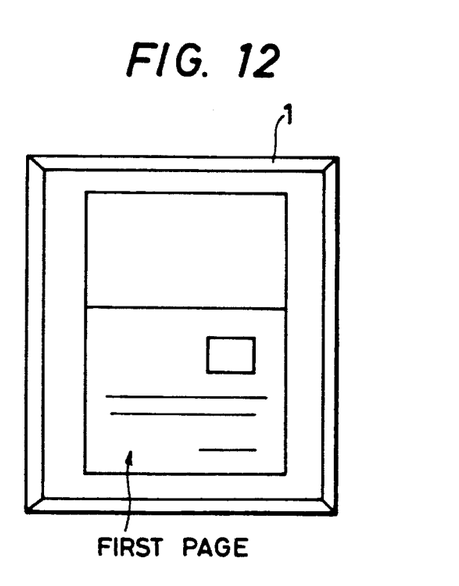
FIGS. 12 to 15 are diagrams for explaining the window display in the case of the upper binding.
Figure 13:
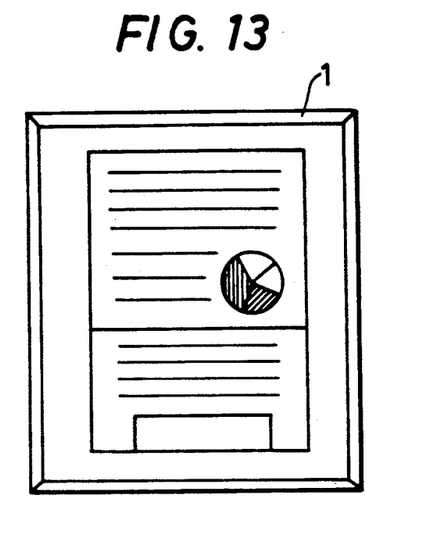
Figure 14:
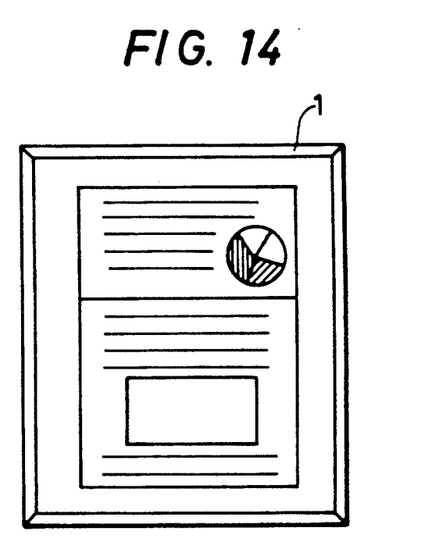
Figure 15:
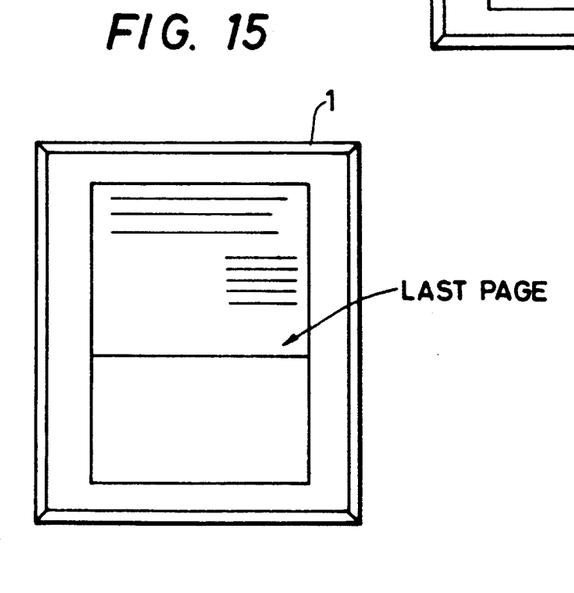

Further, in addition to the above embodiment, if the binding is on the upper side as shown in FIG. 11 an effect similar to the foregoing embodiment can be derived by simultaneously displaying the upper and lower pages on the CRT as shown in FIGS. 13 and 14.

In the foregoing two embodiments, a description has been provided with respect to the case where the width of the preceding or next page (which is displayed together with the relevant designated page) is about ⅓ of the designated page which is displayed. However, the displaying position of the preceding or next page can be also changed by use of a horizontal or vertical scrolling function.

If the display capacity is increased to more than two pages, for example, three pages, and the contents of three pages are displayed, the relation of the documents dispersed in three pages can be seen at a glance, so that the documents can be further easily edited. However, in this case, an indication of whether the page is printed on the left side or right side after completion of the printing is displayed under the display picture of each page.

As described above, not only the designated page but also the pages adjacent thereto are also simultaneously displayed in the window. Thus, the position to which the page being displayed corresponds after it was printed and bound, as shown in FIG. 2 or 11, can be known at a glance while the file is being made. In particular, in the case of using a two-sided printer, the editing as shown in the foregoing examples is frequently executed; therefore, the division display method of the embodiments is very useful and convenient.

As described above, according to the invention, continuous pages can be simultaneously seen in one display screen together with the printing positions when they are printed, so that the document can be very easily created and edited.

Figure 6C:
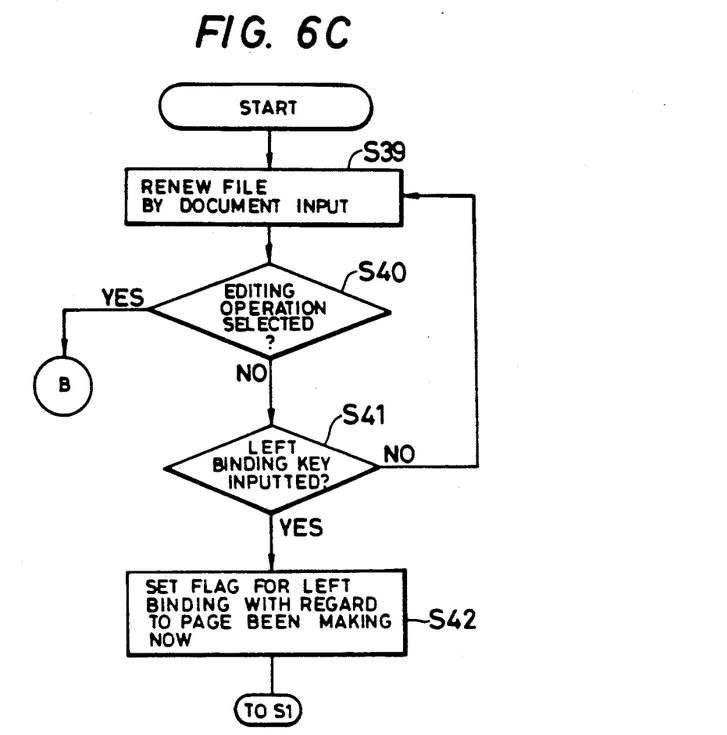

The case where the document in the file is read out and subjected to the edition, such as modification and the like, has been described above. However, it is apparent that the operator may want to output both pages (the nth page and the (n+1)th page) including, for example the headline shown in FIG. 1, as the double-spread page when creating the document. In this case, therefore it is sufficient to set the "LEFT BINDING" flag 15 for, e.g., the (n+1)th page upon creating the document. Namely, in the other process in step S2 in FIG. 6A, by setting the (n+1)th page such that it is printed on the right side of the double-spread page when it is outputted in the document creating mode, the nth page is inevitably printed on the left side. The relations of the output positions of a plurality of special pages can be set during the document creating operation. In FIG. 6C, the document file is updated due to the document creating operation in step S39. It is apparent that the process to designate the two-sided print is included here. In the next step S40, a check is made to see if the editing operation shown in step S1 in FIG. 6A has been selected or not during the document making operation. If YES, the processing routine advances to (B). If NO, step S41 follows. A check is made in step S41 to see if the left binding key 20 has been inputted or not. If YES, step S42 follows and the "LEFT BINDING" flag is set for the page which is currently being made. Thus, the page which is currently being made can be printed to the right (or left) side of the double-spread page and the preceding page of that page can be inevitably set to the left side of the same double-spread page (or the next page can be set to the right side of the same double-spread page).

As described in detail above, even while the document is being made or the document is being edited, the output format of at least two continuous pages can be designated. Thus, the document can be very easily edited and outputted without breaking a desired output format. In addition, even if the document is modified, it is possible to prevent the output format of two related pages from being broken. In a system which can perform two-sided printing, the invention is further useful.

What is claimed is:

1. A document processing system comprising:

storage means for storing files of documents, said documents comprising a plurality of continuous pages;

page information storage means for storing page information of plural pages;

display means for displaying the files of documents;

selecting means for selecting a left or other binding position for the document pages;

information generating means for designating displaying a single page or displaying at least two continuous document pages including the single page; and control mans for controlling said display means to display the page information of at least two continuous document pages in accordance with the selected binding position and to display information indicative of a spread direction of the displayed continuous document pages when said information generating means designates display of the at least two continuous pages, and wherein, when a left binding position is selected and a page to be displayed is an even number page, the information belonging to the page to be displayed is displayed on right hand side of the display means and the information belonging to the preceding page is displayed on a left hand side of the display means, and, when the page to be displayed is an odd number page, the information belonging to the page to be displayed is displayed on the left hand side of the display means and the information belonging the succeeding page is displayed on the right hand side of the display means.

2. A document processing system according to claim 1, wherein said display means includes means for displaying the binding position of each displayed document page.

3. A document processing system according to claim 1, further comprising editing means for editing document information.

4. A document processing system according to claim 3, wherein said editing means includes means for creating a document and means for modifying the created document,
   and wherein said selecting means includes means for selecting said binding position while a document is being created or while the created document is being modified.

5. A document processing system according to claim 1, including page designating means for designating a page of the document information.

6. A document processing system according to claim 5, wherein said control means controls said display means to cause the page designated by said page designating means to be displayed on said display means.

7. A document information display system comprising:

means or storing document information to be written on a plurality of pages and first information which includes at least a page number to be displayed;

display means for displaying the document information;

designating means or designating pages to be displayed in continuous form;

judgment means for judging whether or not the pages designated by said designating means are beginning or end pages;

control mans for controlling said display means to display in a spread direction pattern that makes the beginning or end page visible when the page judged by said judging means is determined to be the beginning or end page, wherein, when the beginning page is to be displayed, the information belonging to the beginning page to be displayed is displayed on a right hand side of the display means and a blank page is simultaneously displayed on a left hand side of the display means, and wherein, when the end page having an even number is to be displayed, the information belonging to the end page to be displayed is displayed on the left hand side of the display means and a blank page is simultaneously displayed on the right hand side of the display means.

8. A document information display method comprising the steps of:

storing document information to be written on a plurality of pages;

displaying the document information;

designating display of pages to be displayed;

judging whether or not the designated page is at a beginning of said plurality of pages in which said document information is written; and controlling said display to display in a spread direction pattern when the judged page is determined to be the beginning or an end page, wherein, when the beginning page is to be displayed, the information belonging to the beginning page to be displayed is displayed on a right hand side and a blank page is simultaneously displayed on a left hand side, and wherein, when the end page having an even number is to be displayed, the information belonging to the end page to be displayed is displayed on the left hand side and a blank page is simultaneously displayed on the right hand side.

9. A method according to claim 8, further comprising the step of storing format information used by said display for displaying the document information.

10. A method according to claim 9, wherein the format information includes data corresponding to (1) a page number to be displayed and (2) a number of characters which can be displayed in a single page.

11. A document information display system comprising:

means for storing document information to be written on a plurality of pages;

display means for displaying the document information;

designating means for designating pages to be displayed in continuous form;

judgment means for judging whether or not the page designated by said designating means is at a beginning of said plurality of pages in which said document information is written; and control means or controlling said display means to display in a spread direction pattern that makes the beginning or an end page visible when the page judged by said judgment means is determined to be the beginning page or the end page, wherein, when the beginning page is to be displayed, the information belonging to the beginning page to be displayed is displayed on a right hand side of the display means and a blank page is simultaneously displayed on a left hand side of the display means, and wherein, when the end page having an even number is to be displayed, the information belonging to the end page to be displayed is displayed on the left hand side of the display means and a blank page is simultaneously displayed on the right hand side of the display means.

12. A document information display method comprising the steps of:

storing document information to be written on a plurality of pages;

displaying the document information;

designating display of prescribed pages of the plurality of pages on which the document information is to be written;

judging whether or not one of the designated pages is at a beginning or an end of the plurality of pages in which said document information is written;

controlling said display to display in a pattern identifying that the judged page is determined to be the beginning or the end page, wherein, when the beginning page is to be displayed, the information belonging to the beginning page to be displayed is displayed on a right hand side and a blank page is simultaneously displayed on a left hand side, and wherein, when the end page having an even number is to be displayed, the information belonging to the end page to be displayed is displayed on the left hand side and a blank page is simultaneously displayed on a right hand side.

13. A method according to claim 12, further comprising the step of storing format information used by said display for displaying the document information.

14. A method according to claim 13, wherein the format information includes data corresponding to (1) a page number to be displayed and (2) a number of characters which can be displayed on a single page.

15. A document information display system comprising:

document information storing means for storing information of a document comprising plural pages;

page information storing means for storing page information of the plural pages;

control means for controlling display of the information stored said document information storing means on a display means; and change instructing means for changing the display of the information on said display means, wherein, when the information corresponding to one page of the document information is displayed on said display means responsive to an instruction from said change instruction means and based on the page information stored in said page information storing mean, the information of pages next preceding and next following the page of information to be displayed, and the information of the page to be displayed is displayed on the display means under the control of said control means, and wherein, when the information to be displayed belongs to an even number page, the information to be displayed is displayed on a left hand side of the display means and the information which belongs to the following page is displayed on a right hand side of the display means, and, wherein, when the information to be displayed belongs to an odd page, the information to be displayed is displayed on the right hand side of the display means and the information which belongs to the preceding page is displayed on the left hand side of the display means.

16. A system according to claim 15, wherein
when the information to be displayed belongs to a first page, the information of the first page is displayed on the right hand side of the display means, and a blank page is displayed on the left hand side of the display means.

17. A system according to claim 15, wherein
when the information to be displayed belongs to a last page of an even number, the information of the last page is displayed on the left hand side of the display and a blank page is displayed on the right hand side of the display.

18. A document information display method comprising the steps of:
storing information of a document comprising plural pages;
storing page information of the plural pages;
controlling display of the stored information of the document on a display; and
instructing a change of the display of the information on said display,
wherein, when the information corresponding to one page of the document information is displayed on said display responsive to an instruction and based on the stored page information, the information of pages next preceding and next following the page of information to be displayed, and the information of the page to be displayed is displayed on the display means according to the display control, and
wherein, when the information to be displayed belongs to an even number page, the information of the even number page to be displayed is displayed on a left hand side and the information which belongs to the following page is displayed on a right hand side, and, when the information to be displayed belongs to an odd page, the information of the odd number page to be displayed is displayed on the right hand side and the information which belongs to the preceding page is displayed on the left hand side.

19. A method according to claim 18, wherein,
when the information to be displayed belongs to a first page, the information of the first page is displayed on the right hand sided and a blank page is displayed on the left hand side.

20. A method according to claim 18, wherein,
when the information to be displayed belongs to a last page of an even number, the information of the last page of even number is displayed on the left hand side and a blank page is displayed on the right hand side.

* * * * *

UNITED STATES PATENT AND TRADEMARK OFFICE
CERTIFICATE OF CORRECTION

PATENT NO. : 5,289,569
DATED : February 22, 1994
INVENTOR(S) : YUKARI TANIGUCHI

It is certified that error appears in the above-indentified patent and that said Letters Patent is hereby corrected as shown below:

COLUMN 1

Line 32, "is bound to" should be deleted.
Line 34, "read, the documents;" should read --read the document--.

COLUMN 3

Line 15, "DISP-MAX 13: PAGEMAX" should read --PAGEMAX 13:--.
Line 18, "DAGEMAX 14:" should read --DISP-MAX 14:--.
Line 39, "odd-number (evennumber)" should read --odd number (even number)--.

COLUMN 4

Line 18, "odd-number" should read --odd number--.
Line 21, "odd-number" should read --odd number--.
Line 47, "even-number" should read --even number--.

COLUMN 5

Line 9, "page" should read --pages--.
Line 25, "the edition," should read --editing,--.

COLUMN 6

Line 24, "on" should read --on a--.
Line 57, "or" should read --for--.

UNITED STATES PATENT AND TRADEMARK OFFICE
CERTIFICATE OF CORRECTION

PATENT NO. : 5,289,569
DATED : February 22, 1994
INVENTOR(S) : YUKARI TANIGUCHI

It is certified that error appears in the above-indentified patent and that said Letters Patent is hereby corrected as shown below:

COLUMN 8

Line 45, "stored" should read --stored in--.
Line 54, "mean," should read --means,--.

COLUMN 9

Line 3, "wherein" should read --wherein,--.
Line 9, "wherein" should read --wherein,--.

COLUMN 10

Line 19, "sided" should read --side--.

Signed and Sealed this

Thirteenth Day of September, 1994

Attest:

BRUCE LEHMAN

Attesting Officer        Commissioner of Patents and Trademarks